US006169340B1

(12) United States Patent
Jones

(10) Patent No.: US 6,169,340 B1
(45) Date of Patent: Jan. 2, 2001

(54) ELECTRICAL JUNCTION BOX FOR AUXILIARY POWER

(76) Inventor: Dale A. Jones, 739 Adell Ave., Idaho Falls, ID (US) 83402

( * ) Notice: Under 35 U.S.C. 154(b), the term of this patent shall be extended for 0 days.

(21) Appl. No.: 09/293,368

(22) Filed: Apr. 16, 1999

(51) Int. Cl.$^7$ .................................................... H02J 9/00
(52) U.S. Cl. ............................. 307/64; 307/85; 307/70
(58) Field of Search .................... 307/64–66, 70, 307/80, 81, 51, 68, 23, 85–87, 43, 82–84, 150

(56) References Cited

U.S. PATENT DOCUMENTS

| | | | |
|---|---|---|---|
| 3,631,324 | * 12/1971 | Jones ........................................ 317/99 |
| 3,647,997 | * 3/1972 | Nerem ................................. 200/50 C |
| 3,936,782 | * 2/1976 | Moakler et al. ......................... 307/64 |
| 4,021,678 | * 5/1977 | Moakler et al. ......................... 307/64 |
| 4,157,461 | * 6/1979 | Wiktor .................................... 307/64 |
| 4,297,551 | * 10/1981 | Ronk ................................... 200/67 B |
| 4,760,278 | * 7/1988 | Thomson ................................ 307/64 |
| 4,946,096 | * 8/1990 | Ballard et al. .......................... 307/66 |
| 5,483,108 | * 1/1996 | Girard et al. ........................... 307/64 |
| 5,515,235 | * 5/1996 | Stoller ................................... 361/605 |
| 5,761,027 | * 6/1998 | Flegel .................................... 361/663 |
| 5,894,981 | * 4/1999 | Flegel ..................................... 307/64 |
| 5,984,719 | * 11/1999 | Flegel ..................................... 439/528 |

OTHER PUBLICATIONS

Product information from Gen/Tran Corporation, www.gen-tran.com, copyright 1999,2000.
Product information from Connecticut Electric Products, www.connecticut-electric.com, copyright 1999.
Product information from Relaince Time Controls, www.reliancecontrols.com, copyright 1999.

* cited by examiner

Primary Examiner—Fritz Fleming
(74) Attorney, Agent, or Firm—L. E. Carnahan

(57) ABSTRACT

An electrical junction box or plug connector for auxiliary power, which enables a quick and easy connection of an auxiliary power source, such as a generator, to a single hard wired appliance, such as a gas furnace, pellet stove, fireplace insert, etc., without supplying power to the main power circuit, such as the breaker panel. The junction box includes a male terminal adapted to be connected to a female terminal of an extension cord of a generator, for example, includes a toggle switch to direct power from the generator to only a single appliance, and may include a current breaker or fuse for the electrical circuit. Thus, with an electric power supply outage, the furnace, for example, may be operated by a small generator.

18 Claims, 3 Drawing Sheets

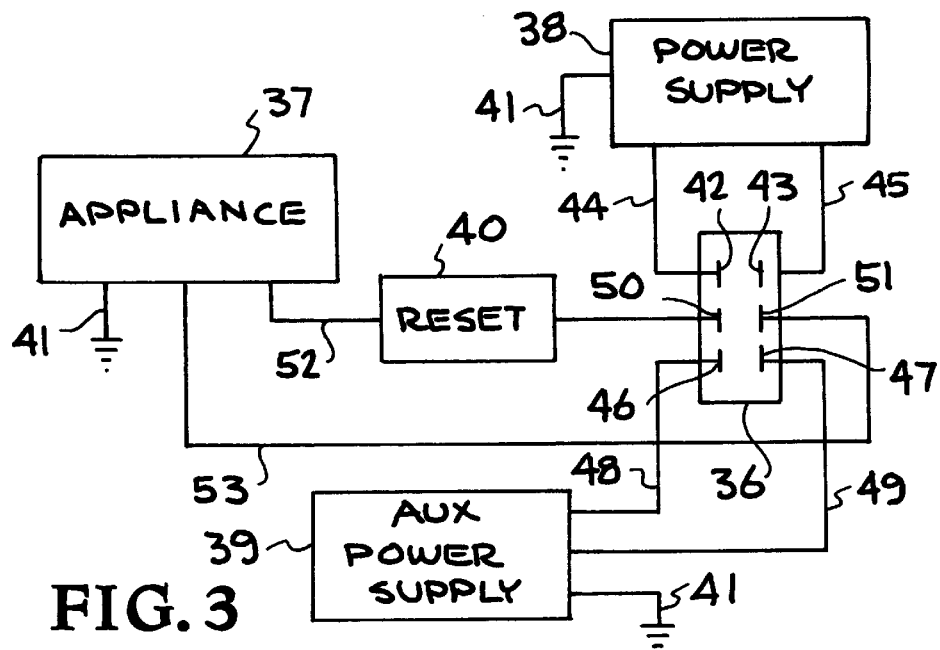
FIG. 3
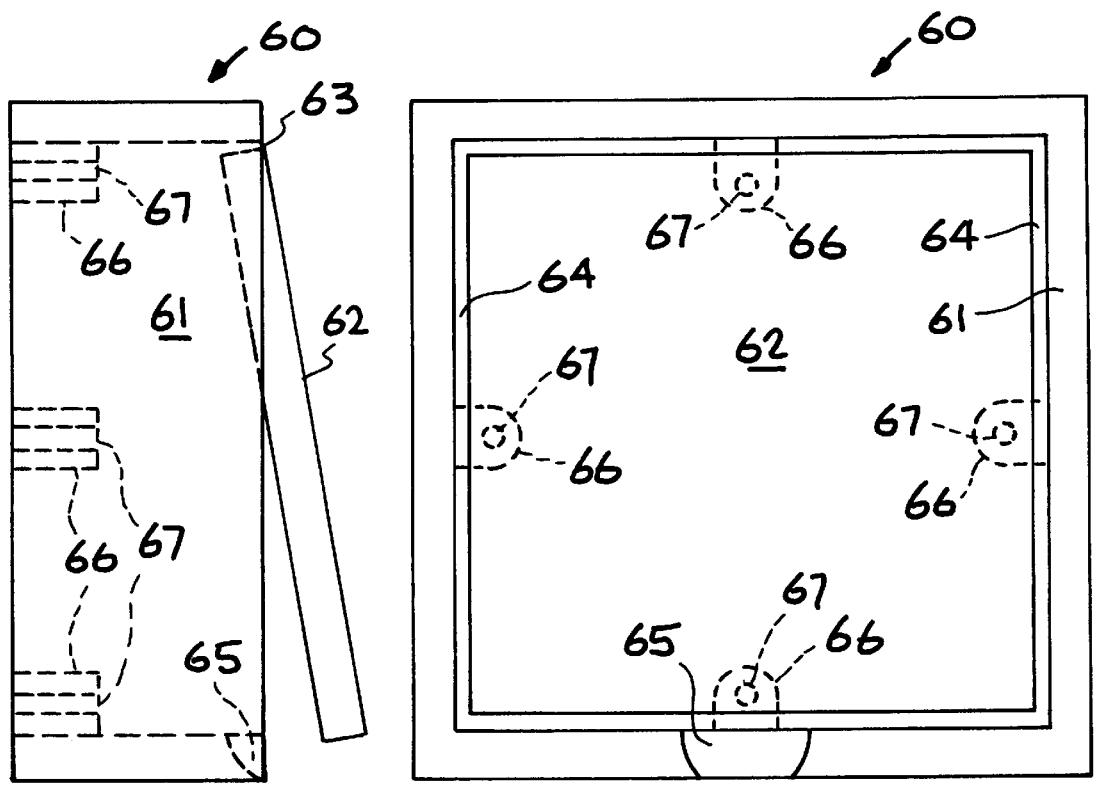
FIG. 4
FIG. 5

ELECTRICAL JUNCTION BOX FOR AUXILIARY POWER

BACKGROUND OF THE INVENTION

The present invention relates to electrical connectors, particularly to an electrical junction box for connecting an auxiliary power source to an electrical appliance, and more particularly to a cover plate having a quick and easy connection for an electrical junction box for connecting auxiliary power, and which includes a switch whereby only a single appliance can be connected to the auxiliary power source.

Auxiliary power sources, such as a generator, battery bank, etc., have long been used as backup for a main power supply. Generators, for example, are usually connected to the main power circuit of the building via an extension cord normally having a female type end connector. Thus, various electrical connector devices have been developed to interconnect the extension cord of the generator to the main power circuit of the building, such connections usually being made via an electrical outlet in the building whereby current flows back to the main breaker panel and on to the various electrical outlets, switches, etc. Such prior known electrical connector devices for connecting an auxiliary power source to the main power circuit is exemplified by U.S. Pat. No. 5,118,301 issued Jun. 2, 1992.

A problem which has existed relative to the use of generators, for example, for home use is that the generator is not large enough to supply sufficient power to the entire household, and thus certain appliances, when used, draw all the current produced, whereby the generator is ineffective. Also, with a normal power outage, gas appliances, for example a furnace such as those operating on natural gas or propane cannot operate even though there is a supply of gas, and even with an auxiliary power supply connected to the main power circuit there is insufficient power produced with small generators to operate the furnace because of the power being directed to other areas of the household. Thus, under cold temperature conditions, for example, the gas furnace cannot operate even though a small generator is being utilized to power the household. Also, it has been previously necessary to disconnect one of the hard wire connections to isolate an appliance.

The present invention provides a solution to the problems associated with the above-referenced use of small household auxiliary power sources, such as generators. The invention involves a junction box cover or plug connector mounted, for example, adjacent a gas furnace having a male connector for connection to a female extension cord, and which includes a switch where, when activated, power from the generator is directed only to the electrical circuit of the furnace and is not fed back to the main breaker panel. During non-auxiliary power use, the switch is activated to connect power from the main breaker panel to the furnace and bypass the connection to the male connector of the junction box. The junction box may include a protective circuit breaker in the circuit. The invention provides a quick and easy connection which can isolate and connect a single appliance to an auxiliary generator without having to disconnect one of the hard wire connections at the appliance or the main breaker box.

SUMMARY OF THE INVENTION

It is an object of the present invention to provide a connector between an electrical appliance and an auxiliary power source.

A further object of the invention is to provide a cover connector for an electrical junction box for an auxiliary power supply.

Another object of the invention is to provide a junction box cover that allows a quick and easy connection for an auxiliary power source to a single hard wired appliance.

Another object of the invention is to enable connection of an auxiliary power source to a selected electrical appliance while preventing current flow back to the main breaker panel.

Another object of the invention is to provide a junction box cover plate for interconnecting an auxiliary power source to an appliance, such as a gas furnace, and which includes a switch for controlling electrical current to the appliance from either the auxiliary power or from the main breaker panel, and or preventing current flow to the main breaker panel or to electrical contacts of the junction box.

Other objects and advantages of the present invention will become apparent from the following description and accompanying drawings. The present invention is basically an electrical connector device for transmitting power between a female connector device, such as the power output of an auxiliary generator, to an electrical appliance. The invention involves an electrical junction box cover plate or plug connector for auxiliary power and enables a quick and easy connection of an auxiliary power source (generator, battery bank, etc.) to a single hard wired appliance. The invention is primarily for use by homeowners and small businesses, and the single appliance may, for example, be a natural gas or propane furnace, pellet stove, sump pump, fireplace insert, etc. to be powered by a small generator. The junction box cover plate includes a switch assembly and may include a protective circuit breaker. The switch assembly is constructed such that it connects either the main power circuit or the auxiliary power source to the single appliance. Thus, by the switch assembly, when the main power circuit is applied, the junction box connector is disconnected from the connector to the auxiliary source, and when the auxiliary power source is applied, the main power circuit is disconnected and no current from the auxiliary power source or junction box is fed back to the main breaker panel.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 3 is an electrical schematic illustration of the junction box of FIG. 1 connected to a single appliance, a main power supply, and an auxiliary power source.

FIGS. 4 and 5 are side and front views of a cover box for the junction box of FIG. 1.

DETAILED DESCRIPTION OF THE INVENTION

The present invention is directed to a junction box or plug connector for connection to an auxiliary power source which enables the power source to be connected to a single hard wired appliance, such as a gas furnace, pellet stove, fireplace inserts, etc., while preventing current flow back to the breaker panel of the main power supply. Thus, by the use of the junction box, a smaller auxiliary power source, such as a generator, may be utilized. The junction box of this invention is primarily intended for use in homes and small businesses to enable use of certain gas appliances when the main power supply is under an outage condition. The junction box includes an auxiliary plug connector, a switch assembly, and may include a protective circuit breaker. By appropriate switching of the switch assembly, which may be a conventional toggle switch, and by wiring the junction box to a specified electrical appliance such as a gas furnace, the appliance can be powered by either the main power supply or an auxiliary power source (generator, battery bank, etc.) While switched to the main power supply, the circuit to the plug connector for auxiliary power source is open, preventing current flow to the auxiliary plug connector. When switched to the auxiliary power source, the circuit to the main power supply is open preventing current flow back to the main breaker panel. Thus, the junction box of this invention enables direct connection of an auxiliary power source to a specific appliance thus enabling use of smaller auxiliary power source to operate the specified appliance.

Figure 1:
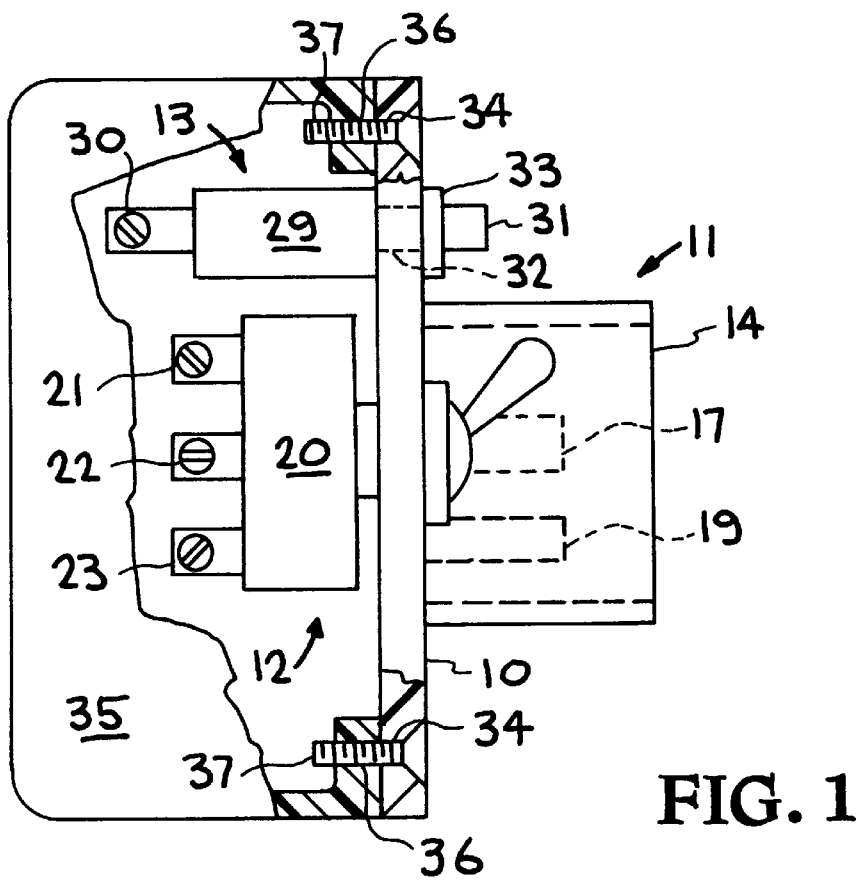
FIG. 1 is a side view of an embodiment of the junction box cover plate made in accordance with the present invention.
Figure 2:
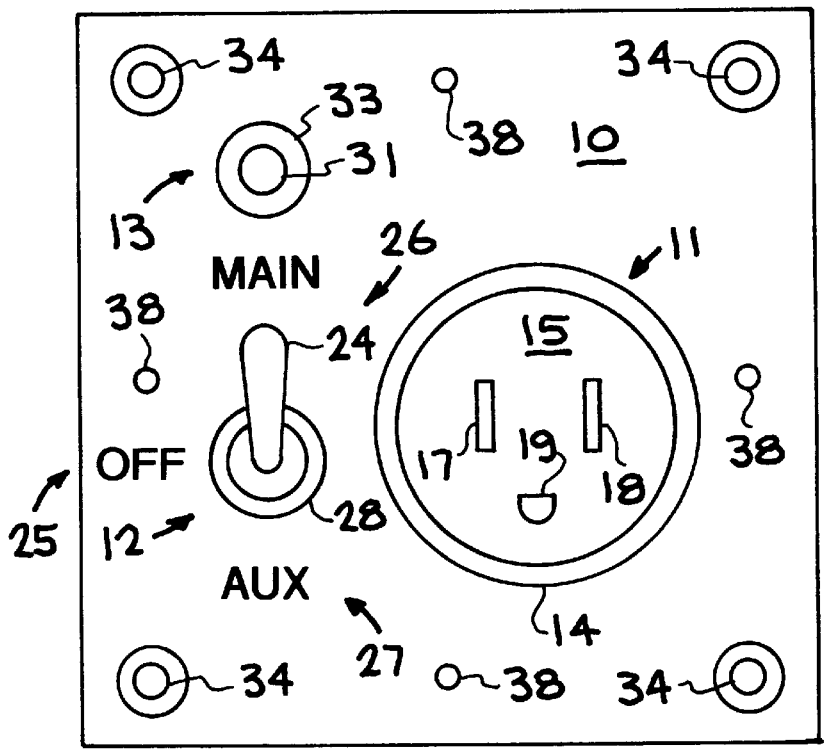
FIG. 2 is a front view of the junction box cover plate of FIG. 1.

Referring now to the drawings, FIGS. 1 and 2 illustrate an embodiment of a junction box made in accordance with this invention and basically comprises a standard electrical box cover or plate 10 constructed, for example, of plastic, or bakalite, to which is mounted an auxiliary male plug connector generally indicated at 11, a double-acting switch assembly generally indicated at 12, and a protective circuit breaker 13. As seen more clearly in FIG. 1, the male plug connector 11 includes a protective housing 14, which may be constructed of plastic or bakalite, within which is located member 15 having a pair of power contacts or blades 17 and 18 and a ground contact or terminal 19. The male (protruding) contacts 17, 18 and 19 are connected to switch assembly 12 which includes a housing 20 and contacts 21, 22 and 23. The switch assembly 12 includes a toggle or member 24 which can be moved from an off position 25 to either a main power position 26, as shown, or to an auxiliary power position 27. The toggle 24 is secured to plate or box cover 10 by a threaded member 28, as known in the art. The protective circuit breaker 13 includes a housing 29 having a contact 30 for connection to the power circuit, and an indicator/reset button 31 secured in an opening 32 in plate 10 by a threaded member 33. Plate or cover box 10 is provided with four (4) corner openings 34 through which screws pass for mounting the plate 10 to a conventional electrical box 35 having attachment members 36 into which screws 37 extend (see FIG. 1). Plate 10 also includes openings 38 into which screws are inserted to retain a cover box thereover, as illustrated in FIGS. 4–5 and described hereinafter. In auxiliary power use, the female connector from a generator, etc. is connected to male contacts 17–19.

FIG. 3 is an electrical schematic for the junction box of FIGS. 1 and 2 whereby an electrical appliance is connected to either the main power supply or to an auxiliary power source. As shown in FIG. 3, the junction box of FIGS. 1–2 is indicated at 36, an electrical appliance is indicated at 37, the main power supply indicated at 38, the auxiliary power supply or source indicated at 39, and the protective circuit breaker/reset button is indicated at 40, with each of the appliance 37 and the main and auxiliary power supplies 38 and 39 being connected to ground as indicated at 41. As shown in FIG. 3, a pair of contacts 42 and 43 of junction box 36 are connected by leads or wires 44 and 45 to the main power supply 38, a pair of contacts 46 and 47 of junction box 36 are connected by leads or wires 48 and 49 to auxiliary power source 39, and a pair of contacts 50 and 51 are connected by leads or wires 52 and 53 to the electrical appliance 37, with the protective circuit breaker 40 being located in lead or wire 52.

FIGS. 4 and 5 illustrate a cover box for the junction box of FIGS. 1 and 2. As shown, the cover box generally indicated at 60 includes a hollow member or housing 61 and a movable cover plate 62 which is constructed to hinge at 63 to enable access into the interior of housing 61. The cover plate 62 is provided with a seal 64 which extends around plate 62 to protect the junction box components from contamination, such as moisture and/or dust. The hollow member or housing 61 includes a tapered, curved cut-away 65 whereby one's finger can be inserted to open the cover plate 62. The housing 61 also includes four (4) protruding sections 66 in which are located openings 67 through which attachment screws, not shown, are inserted and secured in openings 38 in plate 10 of the junction box of FIGS. 1–2. The hinge 63 may be integral with housing 61 and cover plate 62, or it may be of any conventional type hinge secured to housing 61 and cover plate 62. The seal 64 may be constructed of any compatible, flexible material, such as rubber, foam, and soft plastic. The housing 61 and cover plate 62 may be constructed, for example, of plastic, fiberglass, metal, etc.

By way of example, the cover plate 10 and protective housing 14 may be injection molded as a integral assembly, or the housing 14 may be secured as by bonding, soldering, etc. to the plate 10. The member 15 may be mounted flush in an opening in plate 10 or mounted within housing 14 with leads extending through an opening in plate 10 for connecting contacts 17–19 with switch assembly 12, as known in the art. Also, while the plate 10 of FIGS. 1–2 has been shown as being of a square configuration, it may be of a rectangular shape with the housing 14, toggle 24 and indicator 31 positioned in a vertical alignment so as to cooperate with a rectangular mounting box. Also, the plate 10 may be of a circular configuration should the box to which it is to be mounted be circular. Similarly, the cover box of FIGS. 4–5 may be of any configuration needed to cover the plate 10 of FIGS. 1–2.

Figure 7:
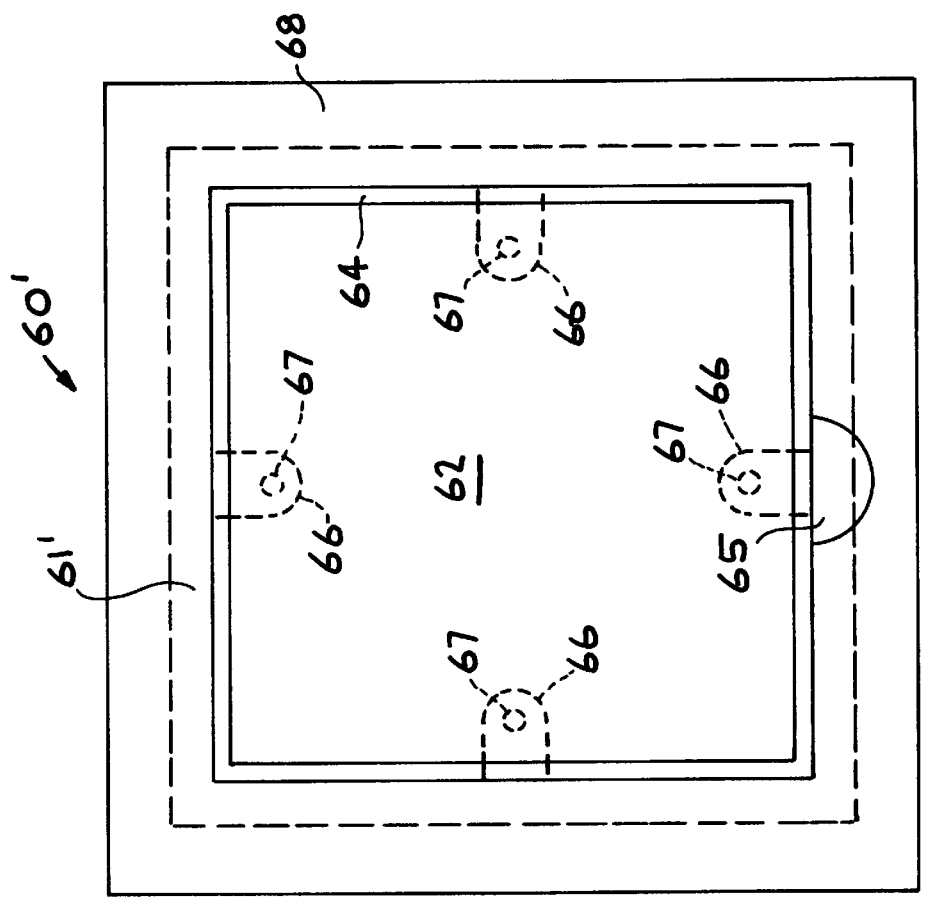
FIGS. 6 and 7 illustrate side and front views of a cover box for the junction box of FIG. 1 for a flush mounted arrangement of the junction box in a wall.
Figure 6:
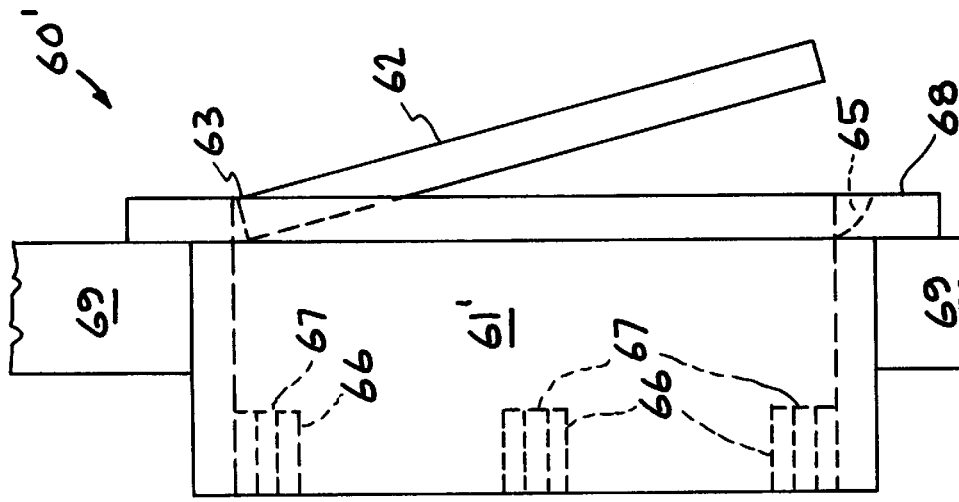

The plate 10 of the junction box of FIGS. 1–2 may be mounted so as to be exterior to a wall surface, with the cover box of FIGS. 4–5 mounted so as to be protruding from the wall. However, the junction box and cover box may be mounted so as to be substantially flush with a wall surface, similar to the mounting of conventional outlets. FIGS. 6 and 7 illustrate a cover box which is mounted flush to a wall surface, and the primary difference between FIGS. 6–7 and FIGS. 4–5 is an outwardly protruding flange about the housing of the cover box. Components in FIGS. 6–7 which correspond to components of FIGS. 4–5 are given corresponding reference numerals. As seen in FIGS. 6–7, the hollow member or housing 61' of cover box 60' is provided with an outwardly extending flange 68 which is adapted to be positioned adjacent a wall 69 in which the junction box of FIGS. 1 and 2 is mounted. Thus, upon opening of the movable cover plate 62, the junction box of FIGS. 1–2 is available for being connected to a female end of an extension cord, generally used for auxiliary generators.

The junction box of the present invention may be mounted close to the appliance (such as a gas furnace) to be powered by the auxiliary power source, or it may, for example, be mounted adjacent the main breaker box and connected to the circuit from the breaker box leading to the single appliance to be powered by the auxiliary power source. Those skilled in the art will be enabled to mount the junction box of the present invention where most practical, depending on the location and type of auxiliary power source to which it is to be connected.

It has thus been shown that the present invention provides a junction box or plug connector by which an auxiliary power source may be connected to a single hard wired electrical appliance, such as a gas furnace, whereby when auxiliary power is connected to the single appliance, there is no current flow from the appliance to the breaker box of the main power supply, and when the current is flowing from the main power supply, no current will flow to the junction box or plug connector male contacts. This is accomplished by a switch assembly which functions to open the circuit to the breaker box or the circuit to the junction box male contacts, thus either power source may be connected to the same single appliance by movement of the switch and without undesired current flow.

While a particular embodiment of the junction box or plug connector and embodiments of cover boxes therefor have been illustrated and described to exemplify and teach the principles of the invention, such are not intended to be limiting. Modifications and changes may become apparent to those skilled in the art, and it is intended that the invention be limited only by the scope of the appended claims.

What is claimed is:

1. A device for connecting an auxiliary electrical power source to only a single hard wired appliance, comprising:
   a male connector adapted to be connected to an associated auxiliary power source, and
   a switch having an off position and two on positions operatively connected to said male connector and adapted to be connected to an associated hard wired appliance and adapted to be connected to a main electrical power source,
   whereby activation of said switch enables a closed circuit between such an associated auxiliary power source and such an associated hard wired appliance, and provides an open circuit between such an associated hard wired appliance and such an associated main power source.

2. The device of claim 1, wherein said switch is constructed, when activated, to also provide a closed circuit between such an associated main power source and such an associated hard wired appliance, and provide an open circuit between such an associated hard wired appliance and said male connector.

3. The device of claim 1, wherein said switch comprises a double-action toggle switch.

4. The device of claim 1, additionally including a protective circuit breaker/reset button adapted to be operatively connected to an associated hard wired appliance.

5. The device of claim 1, wherein said male connector and said switch are mounted to a plate, said plate being constructed to be mounted on an electrical box.

6. The device of claim 5, additionally including a protective circuit breaker mounted to said plate and adapted to be connected to an associated hard wired appliance.

7. The device of claim 5, wherein said male connector includes a protective housing surrounding three contacts.

8. The device of claim 7, wherein said plate and protective housing of said male connector are integral.

9. The device of claim 1, wherein said single hard wired appliance is selected from the group consisting of a gas-type appliance, a pellet-burning appliance, fireplace and sump pump.

10. In an electrical box for connection to an associated single hard wired appliance and to an associated breaker box of a main electrical power supply, the improvement comprising means for connection to an associated auxiliary electrical power supply, said means including:
    a face plate adapted to be removably mounted to said electrical box,
    a switch mounted to said face plate, and
    a male electrical connector mounted to said face plate and operatively connected to said switch,
    said switch being adapted to be connected to such an associated single hard wired appliance, to such an associated auxiliary electrical power supply, and to such an associated breaker box.

11. The improvement of claim 10, additionally including a protective circuit breaker adapted to be connected to such an associated hard wired appliance.

12. The improvement of claim 10, wherein said switch has an off position and two on positions.

13. The improvement of claim 12, wherein said switch is of a toggle type.

14. The improvement of claim 10, wherein said male electrical connector includes a housing and a plurality of electrical contacts within said housing.

15. The improvement of claim 14, wherein said housing and said face plate are integral.

16. An electrical box for connecting auxiliary power to a single hard wired appliance, including:
    a face plate adapted to be removably mounted to said box,
    a plural action switch mounted to said face plate, and
    an electrical male connector mounted to said face plate and electrically connected to said plural action switch,
    said electrical male connector being adapted to be connected to a female connector of an auxiliary generator,
    said plural action switch being adapted to be connected to an associated single hard wired appliance and adapted to be connected to an associated main power supply.

17. The electrical box of claim 16, additionally including a circuit breaker mounted to said face plate and adapted to be connected to an associated single hard wired appliance.

18. The electrical box of claim 16, wherein said plural action switch is of a toggle type, and wherein said electrical male connector includes a protective housing in which a plurality of male contacts are located.

* * * * *